Aug. 17, 1954

C. HARDEN 2,686,541

CITRUS JUICE EXTRACTING MACHINE

Filed Dec. 2, 1950

CARL HARDEN
INVENTOR.

BY

ATTORNEYS

Aug. 17, 1954

C. HARDEN 2,686,541

CITRUS JUICE EXTRACTING MACHINE

Filed Dec. 2, 1950

CARL HARDEN
INVENTOR.

BY

ATTORNEYS

Patented Aug. 17, 1954

2,686,541

UNITED STATES PATENT OFFICE 2,686,541

CITRUS JUICE EXTRACTING MACHINE

Carl Harden, Pasadena, Calif., assignor to Brown Citrus Machinery Corp., Whittier, Calif., a corporation of California Application December 2, 1950, Serial No. 198,775

10 Claims. (Cl. 146—3)

This invention relates to juice extracting devices and has particular reference to improvements in a citrus juice extracting machine.

One of the principal objects of my invention is to provide a machine of the class described, in which the fruit is halved by a vertical knife blade from whence the halves slide along curved divider plates to be presented, cut half downwardly, to pick-up cups which carry the halves into position for the reaming operation, the travel of the halves being synchronized with the operation of the cups.

Another object of my invention is to provide improved means for the controlled synchronization of the movement of fruit halves between various stations of a citrus juice extracting machine of the character described.

Another object of my invention is to provide a novel divider plate having means whereby sticking or adherence of the fruit halves thereto is reduced to a minimum so that the maximum speed of travel across the plate may be obtained, and having means for the controlled reduction of this maximum speed.

A further object of my invention is to provide a novel spring arm device for guiding and retarding the flow of fruit halves across the face of a divider plate, the device being adapted to accommodate various sizes of fruit halves.

Yet another object of my invention is to provide novel means of the character described above which are inexpensive to fabricate and install.

Other objects and advantages of my invention it is believed will be readily apparent from the following detailed description of a preferred embodiment thereof when read in connection with the accompanying drawings.

Figure 1:
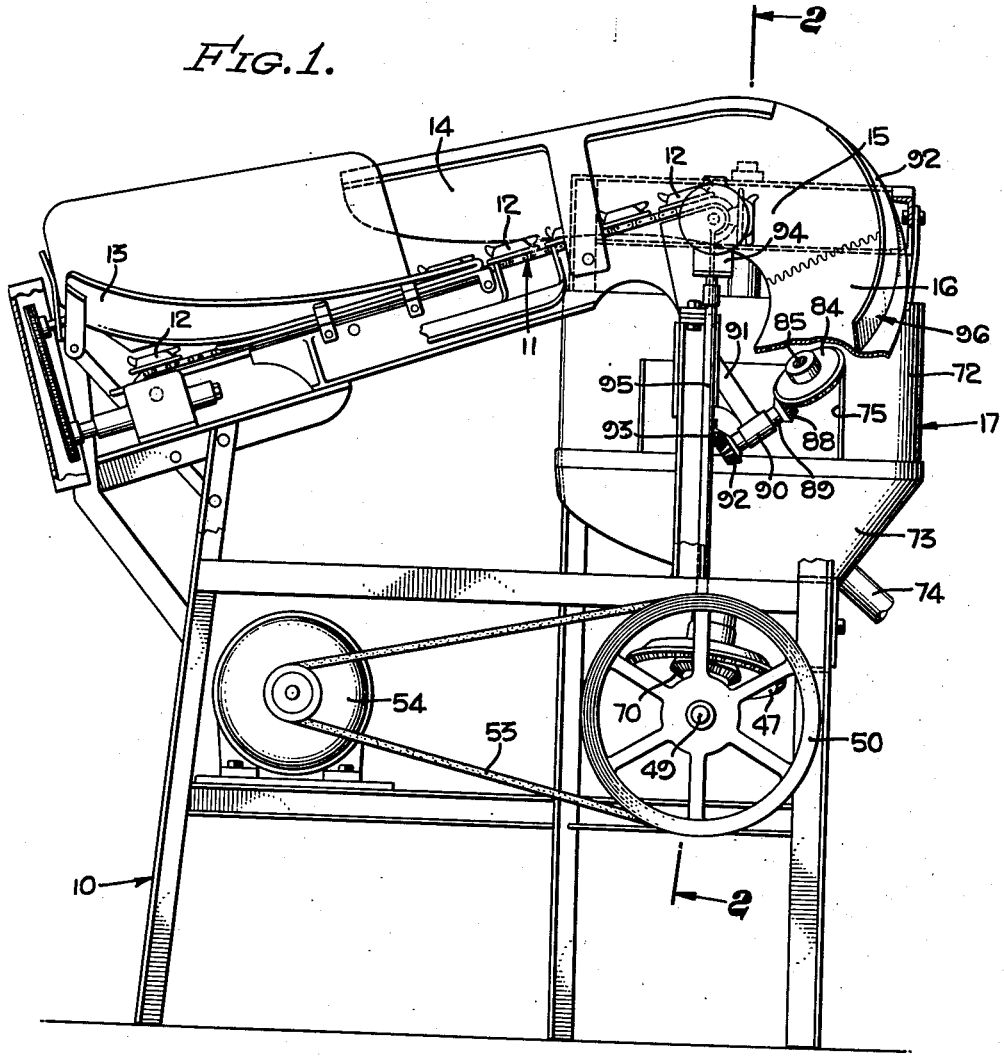
Figure 1 is a side elevation of a citrus juice extracting machine embodying my invention.

Referring now to the drawings, the citrus juice extracting machine embodying my invention is supported on a framework 10 and includes a conveyor 11 provided with cups 12 for carrying individual citrus fruit from a hopper 13 into engagement with the vertical knife blade 14 where the fruit is halved. The fruit halves leave the cups at 15 and are separated to freely slide across the knife blade and onto curved divider plates 16 which cause the fruit to be presented, cut halves downwardly, to the pair of juice extracting mechanisms 17. It is to be understood that the machine is built in duplex, one half of the fruit going to one side of the machine and the other half to the other. As the juice extracting mechanisms on both sides of the machine are of identical construction, it is to be understood that in the following description the machine as described with respect to the handling of one half of the fruit is duplicated on the other side of the machine for the handling of the other half of the fruit.

The divider plate 16 curves from a vertical plane at the knife 14 to a horizontal plane where it merges into a horizontal delivery platform 18 adjacent the juice extracting mechanism 17 which is substantially similar to that disclosed in U. S. Patent 2,199,876 to William O. Brown. This mechanism consists of a fruit pick-up unit generally indicated 19 mounted for rotation about a vertical axis, and a reamer unit generally indicated 20 mounted for rotation about an axis inclined approximately 15° from the vertical, the two units being arranged to operate in synchronism by means of a universal connection 21.

The fruit pick-up unit includes a plurality of cups 22, of resilient material, which are formed in two halves, a fixed half 23 secured to the rotating cup carrier disk 24, and a movable half 25 hinged to the fixed half by means of the pivotal connection 26. The pivotal connection 26 consists of a pivot member 29 having a transversely-extending arm 30 in which is journaled a shaft 31 carrying a roller 32 which engages a fixed cam plate 33. The pivot member is turnably supported on a pin 36 mounted on the bearing member 37 which is secured to the fixed cup half 23. The outer edge of the cam plate 33 is shaped so that as the rollers 32 travel around the plate the cups are caused to open and close to pick up and discharge the fruit halves. Positive movement of the opening of the cups is insured by a cam rail 38 secured to the cam plate 33 and shaped to conform with the cam surface. The cup carrier disk 24 is keyed to a vertical shaft 39 mounted in a suitable bearing 40 on the cross bar 35. The cam plate 33 is bolted to a flange 34 secured to the bearing 40.

Disposed below the lower end of the shaft 39 and extending angularly with respect thereto, is a reamer unit driving shaft 41 mounted in a sleeve 42 which in turn is mounted in a bearing 43 supported on the framework 10. The sleeve 42 is provided with a circular flange 44 to which is attached by means of bolts 45 a circular reamer spindle carrying frame 46. The frame 46 is driven by means of a gear 47 from a gear 48 on drive shaft 49, which shaft is driven by means of a pulley 50 mounted thereon and connected with the motor 54 by means of a belt 53.

Mounted on the frame 46 are a plurality of reamers 55, there being one reamer for each cup 22. The spindle carrying frame 46 consists of a base plate 56 having formed thereon a circular angularly disposed juice deflecting plate 57 terminating outwardly in a circular rim 58. Secured to the upper circular edge of the plate 57 by means of bolts 59 is a circular head or cap 60 which has formed integral therewith a pair of upstanding arms 61 between which is secured a shaft 62. A split yoke element 63 is bolted to the underside of the cup carrier disk 24 and pivotally secured to a cross member 64 journaled on the shaft 62. This arrangement forms a universal joint which serves to center the cup unit and reamer unit and to maintain these members in proper relation to each other.

Figure 2:
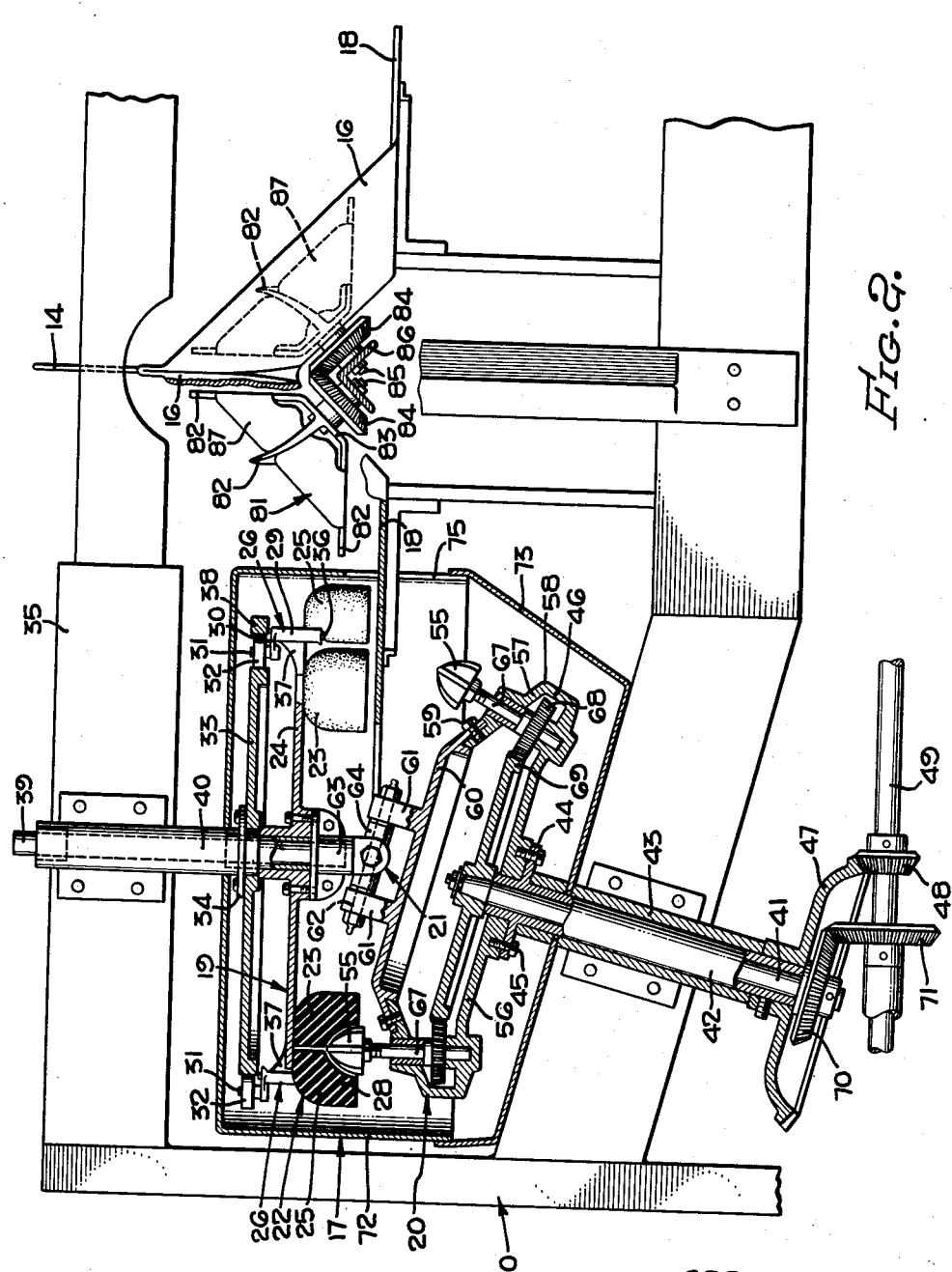
Figure 2 is an enlarged fragmentary sectional view taken substantially on the line 2—2 of Figure 1.

The reamers 55 are mounted on spindles 67, each of which has its lower end journaled in the plate 56 and extends upwardly through a bushing in the deflector plate. The position of the reamers 55 is such that the reamer on the high side of the spindle carrying frame is within one of the cups as shown in Figure 2. For the purpose of rotating the reamers, each reamer spindle 67 is provided with a gear 68 which meshes with a gear 69 secured to the end of shaft 41. The shaft 41 is driven by a gear 70 which meshes with and is driven by a gear 71 on driving shaft 49.

The fruit pick-up unit and the reamer unit are enclosed in a casing 72, the lower portion of which forms a pan 73 to catch the juice from which the collected juice flows by means of a drain pipe 74 to a receptacle (not shown). The casing is cut away as at 75 to permit entry of the fruit above the horizontal platform 18 and the discharge of the skin of the fruit after removal of the juice.

The operation of the pick-up and reaming portions of the machine is as follows: The fruit is picked up from the horizontal delivery platform 18 by a cup 22 which, as it passes over the platform, is completely open. The cup having received the half of fruit closes thereupon by reason of the roller 32 on the cup engaging the cam plate 33, and when the fruit is firmly engaged by the cup it passes beyond the end of the platform 18. At this point the reamer 55 associated with the particular cup holding the fruit starts to enter the fruit. The path of travel of the reamers being angularly disposed with relation to the horizontal travel of the cups, the continued circular movement of the reamers and their associated cups causes the reamer to enter the fruit in the cup. Due to this squeezing action and to the rotation of the reamers with respect to the cups, the juice is extracted from the fruit and is delivered, by gravity, to the pan 73. The continued circular movement of the reamers and cups causes the reamers to move out of the cups, and at the same time the cam action causes the cups to open to discharge the skin of the fruit. The opened cup then proceeds to pick up another fruit half, as described above.

Figure 5:
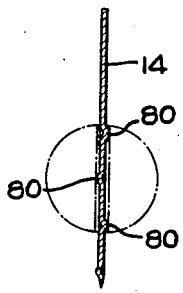
Figure 5 is a sectional elevation taken substantially on the line 5—5 of Figure 3.

It will be understood from the above description that it is highly important that the flow of fruit across the divider plate 16 and to the delivery platform be properly synchronized with the travel of the cups 22. When the fruit is halved by the stationary knife blade 14 and released by the conveyor cups 12 to slide across the divider plates 16, there is a tendency for the fruit to adhere to the knife or divider plates due to atmospheric pressure which forces the freshly cut surface of the fruit against the smooth and relatively flat surface of the knife and plates. Such unwanted adherence is incompatible with the desired synchronized movement of the fruit halves. Means are provided for breaking this seal between the cut face of the fruit and the flat surfaces of the machine, and as shown in the drawings, particularly Figures 3 and 5, these may include a plurality of small raised portions or projections 80 provided on both sides of the knife blade 14 and on the divider plates 16. These projections are preferably formed by striking the reverse side of the knife and divider plates with a center punch or similar tool at uniformly spaced points along the path of travel of the fruit indicated by the arrows in Figure 3. The projections raise the fruit above the plane of the sheet metal surfaces, causing it to travel in a plane formed by the tips of the projections, as shown best in Figure 5, the fruit half being shown in phantom lines. In this manner air, at atmospheric pressure, is introduced between each fruit half and the main body of the knife and divider plates, thus permitting the fruit to slide thereacross at a maximum and uniform speed.

Means are provided to guide the travel of fruit across the divider plates 16 and to retard their speed of travel, and as shown in the drawings these means may include a selector member generally indicated at 81 mounted for rotation on each of the divider plates 16, and the spring retarder member 96. The selector member includes a plurality of curved arms 82 secured to a plate 83 which in turn is fixed to the hub of a gear 84 on a shaft 85 journaled in a cross member 86 of the frame 19. The arms 82 extend radially and are connected together at their outer ends by means of webs 87 of sheet metal which form pockets for the reception of the fruit halves. Each of the selector members 81 is rotated by means of the gears 84 on the shafts 85, the two gears 84 being in engagement with each other and one of the gears being engaged by a beveled pinion 88 mounted on a shaft 89. The shaft 89 is journaled in a bearing 90 which is carried on an arm 91 secured to the frame. A bevel gear 92 is carried on the other end of the shaft 89 and is driven by means of the gear 93 carried on a vertical shaft (not shown) which is geared to the drive shaft 49. The conveyor 11 is also driven from the drive shaft 49 by means of gear box 94 and shaft 95 which is connected to the gear box at one end and geared to the shaft 49 at the other end.

Figure 3:
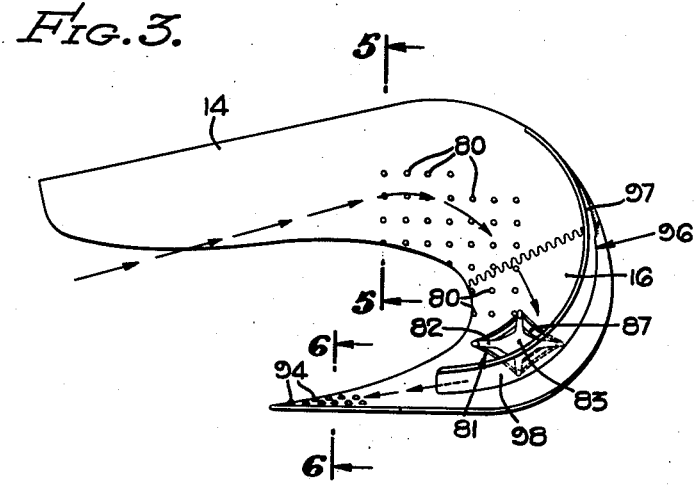
Figure 3 is a detailed side elevation of the vertical knife blade and divider blades embodying my invention.
Figure 4:
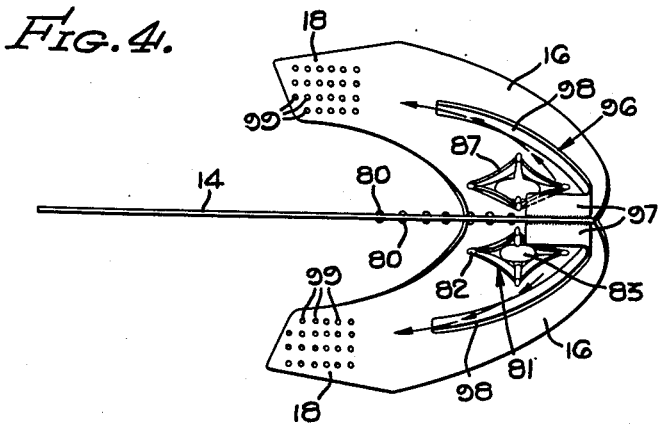
Figure 4 is a detailed top plan view of the vertical knife blade and divider plates.

Mounted on each of the divider plates 16 by any convenient means, such as welding or riveting, is a spring retarder member 96 which consists of an arm curved to conform with the general shape of the divider plate and to cooperate with the selector member 81 in guiding and slowing the speed of the fruit halves. As shown in Figures 3 and 4, the upper portion 97 of the retarder 96 is secured to the divider plate 16, the lower portion 98 being free to spring outwardly. The normal position of this lower portion 98 is immediately adjacent the selector member 81 so as to contact and break the fall of even the very small fruit halves. The spring construction of the retarder permits the lower portion to be deflected outwardly to permit the passage of larger fruit.

Figure 6:
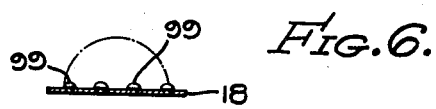
Figure 6 is a sectional elevation taken substantially on the line 6—6 of Figure 3.

Further means are provided to retard the speed of the fruit halves at predetermined points along the divider plates 16. As shown in the drawings, particularly Figures 5 and 6, these means may include a plurality of rivet obstructors 99 mounted in spaced relation on the delivery platform 18 with the rivet heads extending below the lower surface of the platform, the bodies of the rivets extending upward above the upper surface.

I have found that the installation of the rivets 99 in this manner permits the fruit halves to be retarded or even stopped preparatory to being picked up by the cups 22, depending upon the size and shape of the rivets. Interference with the rotating cups and other rotating machine members is avoided since the rivets are relatively small and unobtrusive, and because of the normal clearance between the rivets and the bottoms of the rotating fruit cups.

While I have shown and described a specific embodiment of my invention, I do not limit myself to the exact details of the construction set forth, and the invention embraces such changes, modifications and equivalents of the parts and their formation and arrangement as come within the purview of the appended claims.

I claim:

1. In a citrus juice extracting machine, the combination of a vertical knife blade, means for delivering citrus fruit to said blade to be halved, a pair of divider plates connected with said knife blade, said divider plates being smoothly curved from a vertical plane at the knife blade to a horizontal plane to provide a path for the travel of cut fruit halves from a vertical position to a horizontal pick-up position, a selector member mounted for rotation on each of said divider plates, fruit half pick-up means for delivering fruit halves from said divider plate to a reaming station, means for reaming said fruit to extract the juice therefrom, means on said knife blade and divider plates for admitting atmospheric air to the cut face of the fruit sliding thereacross, and a spring retarder member mounted on each of said divider plates each of said retarder members comprising a spring arm, the upper portion of each arm being secured to the divider plate and the lower portion of each arm being free to be biased by a predetermined size of fruit and lying adjacent to one of said selector members for cooperation therewith to retard the flow of fruit and synchronize the same with the travel of said pick-up means and said reaming means.

2. In a citrus juice extracting machine, the combination of a vertical knife blade, means for delivering citrus fruit to said blade to be halved, a pair of divider plates connected with said knife blade, said divider plates being smoothly curved from a vertical plane at the knife blade to a horizontal plane to provide a path for the travel of cut fruit halves from a vertical position to a horizontal pick-up position, a selector member mounted for rotation on each of said divider plates, fruit half pick-up means for delivering fruit halves from said divider plate to a reaming station, means for reaming said fruit to extract the juice therefrom, and a spring retarder member mounted on each of said divider plates, each of said retarder members comprising a spring arm, the upper portion of each arm being secured to the divider plate and the lower portion of each arm being free to be biased by a predetermined size of fruit and lying adjacent to one of said selector members for cooperation therewith to retard the flow of fruit and synchronize the same with the travel of said pick-up means and said reaming means.

3. In a citrus juice extracting machine, the combination of a vertical knife blade, means for delivering citrus fruit to said blade to be halved, a pair of divider plates connected with said knife blade, said divider plates being smoothly curved from a vertical plane at the knife blade to a horizontal plane to provide a path for the travel of cut fruit halves from a vertical position to a horizontal pick-up position, a selector member mounted for rotation on each of said divider plates, fruit half pick-up means for delivering fruit halves from said divider plate to a reaming station, means for reaming said fruit to extract the juice therefrom, means on said knife blade and divider plates for admitting atmospheric air to the cut face of the fruit sliding thereacross, a plurality of rivet obstructors mounted on the horizontal plane portion of said divider plates, and spring retarder members mounted on said divider plates adjacent said selector members and cooperating with the selector members and with said rivet obstructors to retard the flow of fruit and synchronize the same with the travel of said pick-up means and said reaming means.

4. In a citrus juice extracting machine, a vertical knife blade for halving citrus fruit, a divider plate connected to said knife blade and smoothly curving from a vertical plane at said blade to a horizontal plane so that cut fruit halves may slide downwardly thereacross, means on said knife blade and divider plates for admitting atmospheric air to the cut face of the fruit sliding thereacross, a selector member mounted for rotation on each of said divider plates, and a retarder member mounted on each of said divider plates, each of said retarder members comprising a spring arm, the upper portion of each arm being secured to the divider plate and the lower portion of each arm being free to be biased by a predetermined size of fruit and lying adjacent to one of said selector members for cooperation therewith to retard the flow of fruit and synchronize the same with the operation of subsequent machine members.

5. In a citrus juice extracting machine, a vertical knife blade for halving citrus fruit, a divider plate connected to said knife blade and smoothly curving from a vertical plane at said blade to a horizontal plane so that cut fruit halves may slide downwardly thereacross, a plurality of raised portions on said knife blade and the vertical portion of said divider plate, said raised portions being located in the path of travel of said fruit to raise the fruit above the plane of said blade and divider plate, a selector member mounted for rotation on each of said divider plates, and a retarder member mounted on each of said divider plates, each of said retarder members comprising a spring arm, the upper portion of each arm being secured to the divider plate and the lower portion of each arm being free to be biased by a predetermined size of fruit and lying adjacent to one of said selector members for cooperation therewith to retard the flow of fruit and synchronize the same with the operation of subsequent machine members.

6. In a citrus juice extracting machine, the combination of a vertical knife blade, means for delivering citrus fruit to said blade to be halved, a pair of divider plates connected with said knife blade, said divider plates being smoothly curved from a vertical plane at the knife blade to a horizontal plane to provide a path for the travel of cut fruit halves from a vertical position to a horizontal pick-up position, a selector member mounted for rotation on each of said divider plates, fruit half pick-up means for delivering fruit halves from said divider plate to a reaming station, means for reaming said fruit to extract the juice therefrom, a plurality of spaced projections on the surfaces of said knife blade and divider plate means, said projections being disposed in the path of travel of fruit halves so that atmospheric air is admitted to the cut face of fruit halves as they travel thereacross, a plurality of rivet obstructors mounted on the horizontal plane portion of said divider plates, and spring retarder members mounted on said divider plates adjacent said selector members and cooperating with the selector members and with said rivet obstructors to retard the flow of fruit and synchronize the same with the travel of said pick-up means and said reaming means.

7. In a citrus juice extracting machine, the combination of a vertical knife blade, means for delivering citrus fruit to said blade to be halved, a pair of divider plates connected with said knife blade, said divider plates being smoothly curved from a vertical plane at the knife blade to a horizontal plane to provide a path for the travel of cut fruit halves from a vertical position to a horizontal pick-up position, a selector member mounted for rotation on each of said divider plates, fruit half pick-up means for delivering fruit halves from said divider plate to a reaming station, means for reaming said fruit to extract the juice therefrom, means on said knife blade and divider plates for admitting atmospheric air to the cut face of the fruit sliding thereacross, a plurality of obstructors mounted on the lower portions of said divider plates, and spring retarder members mounted on said divider plates adjacent said selector members and cooperating with the selector members and with said obstructors to retard the flow of fruit and synchronize the same with the travel of said pick-up means and said reaming means.

8. In a citrus juice extracting machine, the combination of a vertical knife blade, means for delivering citrus fruit to said blade to be halved, a pair of divider plates connected with said knife blade, said divider plates being smoothly curved from a vertical plane at the knife blade to a horizontal plane to provide a path for the travel of cut fruit halves from a vertical position to a horizontal pick-up position, a selector member mounted for rotation on each of said divider plates, fruit half pick-up means for delivering fruit halves from said divider plate to a reaming station, means for reaming said fruit to extract the juice therefrom, a plurality of spaced projections on the surfaces of said knife blade and divider plate means, said projections being disposed in the path of travel of fruit halves so that atmospheric air is admitted to the cut face of fruit halves as they travel thereacross, a plurality of obstructors mounted on the lower portions of said divider plates, and spring retarder members mounted on said divider plates adjacent said selector members and cooperating with the selector members and with said obstructors to retard the flow of fruit and synchronize the same with the travel of said pick-up means and said reaming means.

9. In a citrus juice extracting machine, a vertical knife blade for halving citrus fruit, a divider plate connected to said knife blade and smoothly curving from a vertical plane at said blade to a horizontal plane so that cut fruit halves may slide downwardly thereacross, a selector member mounted for rotation on each of said divider plates, and a retarder member mounted on each of said divider plates, each of said retarder members comprising a spring arm, the upper portion of each arm being secured to the divider plate and the lower portion of each arm being free to be biased by a predetermined size of fruit and lying adjacent to one of said selector members for coperation therewith to retard the flow of fruit and synchronize the same with the operation of subsequent machine members.

10. In a citrus juice extracting machine, a vertical knife blade for halving citrus fruit, a divider plate connected to said knife blade and smoothly curving from a vertical plane at said blade to a horizontal plane so that cut fruit halves may slide downwardly thereacross, a plurality of raised portions on said knife blade and the vertical portion of said divider plate, said raised portions being located in the path of travel of said fruit to raise the fruit above the plane of said blade and divider plate, a selector member mounted for rotation on each of said divider plates, a plurality of obstructors mounted on the lower portions of said divider plates, and a retarder member mounted on each of said divider plates, each of said retarder members comprising a spring arm, the upper portion of each arm being secured to the divider plate and the lower portion of each arm being free to be biased by a predetermined size of fruit and lying adjacent to one of said selector members for cooperation therewith and with said obstructors to retard the flow of fruit and synchronize the same with the operation of subsequent machine members.

References Cited in the file of this patent

UNITED STATES PATENTS

| Number | Name | Date |
|---|---|---|
| 1,555,929 | Allan | Oct. 6, 1925 |
| 2,065,271 | Faulds | Dec. 22, 1936 |
| 2,114,217 | Edenfield | Apr. 12, 1938 |
| 2,199,876 | Brown | May 7, 1940 |
| 2,270,007 | McKinnis | Jan. 13, 1942 |
| 2,288,756 | Thompson | July 7, 1942 |
| 2,362,126 | Fry | Nov. 7, 1944 |
| 2,398,780 | Ewald et al. | Apr. 23, 1946 |